(12) United States Patent
Daum

(10) Patent No.: US 7,540,739 B2
(45) Date of Patent: Jun. 2, 2009

(54) THERMOFORMING MACHINE

(75) Inventor: Wolfgang Daum, Ebern (DE)

(73) Assignee: Geiss, AG, Sesslach (DE)

(*) Notice: Subject to any disclaimer, the term of this patent is extended or adjusted under 35 U.S.C. 154(b) by 0 days.

(21) Appl. No.: 11/823,347

(22) Filed: Jun. 27, 2007

(65) Prior Publication Data

US 2008/0014298 A1    Jan. 17, 2008

(30) Foreign Application Priority Data

Jul. 14, 2006    (DE) ...................... 10 2006 032 862

(51) Int. Cl.
*B28B 3/00* (2006.01)
(52) U.S. Cl. ................... 425/394; 425/406; 100/264
(58) Field of Classification Search ............. 425/394, 425/388, 451.3, 406; 100/264
See application file for complete search history.

(56) References Cited

U.S. PATENT DOCUMENTS

| | | | | |
|---|---|---|---|---|
| 3,822,579 A | * | 7/1974 | Kononenko et al. | 72/407 |
| 3,868,209 A | | 2/1975 | Howell | |
| 4,435,244 A | * | 3/1984 | Beck et al. | 156/379.8 |
| 5,061,427 A | | 10/1991 | Hirzel | |
| 5,129,817 A | * | 7/1992 | Ing et al. | 425/589 |
| 5,378,140 A | * | 1/1995 | Asano et al. | 425/451.2 |
| 5,879,724 A | * | 3/1999 | Sakamoto | 425/385 |
| 6,142,763 A | * | 11/2000 | Lee et al. | 425/398 |
| 6,589,041 B2 | * | 7/2003 | Feil | 425/387.1 |
| 7,150,617 B1 | * | 12/2006 | Lowell et al. | 425/78 |
| 2007/0087072 A1 | * | 4/2007 | Peng et al. | 425/395 |

FOREIGN PATENT DOCUMENTS

| | | |
|---|---|---|
| CH | 675096 | 8/1990 |
| DE | 0352466 | 1/1990 |
| DE | 4033534 | 4/1992 |
| DE | 0919356 | 6/1999 |
| DE | 19955519 | 5/2001 |
| DE | 1306180 | 5/2003 |
| DE | 10 2005 039691 | 10/2006 |
| DE | 102005 039691 | 10/2006 |

OTHER PUBLICATIONS

European Search Report dated May 2, 2008.

* cited by examiner

*Primary Examiner*—Maria Veronica D Ewald
(74) *Attorney, Agent, or Firm*—Jenkins, Wilson, Taylor & Hunt, P.A.

(57) ABSTRACT

The invention relates to a thermoforming machine including:
a frame;
a first plate and a second plate for receiving form sections, wherein at least one of the plates is adjustable relative to the frame;
drive means for adjusting the plates relative to each other; and
a pulling mechanism for pulling the second plate in the direction of the first plate, wherein the pulling mechanism includes at least one pulling device mounted to one of the plates, the pulling device including a pulling rod, which can be clamped by a friction locked coupling with an associated clamping device, mounted at the other one of the plates, when adjusting the first and second plates relative to each other.

12 Claims, 2 Drawing Sheets

THERMOFORMING MACHINE

FIELD OF THE INVENTION

The present invention relates to a thermoforming machine.

BACKGROUND ART

Thermoforming machines are generally used for forming flat sheets made from a material, which can be formed when heated, through form sections with cavities disposed therein, wherein the internal shape of each cavity corresponds to the outer shape of an object to be formed in the cavity. Thermoforming machines are well known and comprise e.g. material loading devices, heating devices, forming devices, unloading devices, etc. The technology to process thermoplastic or thermocurable materials with relatively large sizes through thermoforming machines has developed in response to increasing demands in various industries.

The applicant is e.g. familiar with a thermoforming machine, which is provided as a "twin sheet thermo former", this means as a thermoforming machine, in which two parts can be manufactured simultaneously. This thermoforming machine has an upper and a lower plate, which can be adjusted with respect to their elevation relative to a frame through motors. Hydraulic pistons are attached to the upper plate, which can be connected in a solid manner through a form-fit connection via connecting elements to the lower plate. Thus the piston rods are inserted into associated opposite elements, and secured to them in a form-fitting manner. Through the operation of the hydraulic pistons, thus the lower and the upper plate can be strongly pulled against each other.

In this approach it has proven to be disadvantageous, that, due to this form-fitting arrangement, damages in the connecting elements can occur when a certain pulling force is exceeded, so that these have to be replaced or repaired. During this time period the thermoforming machine is out of service and productivity declines in an undesirable manner.

SUMMARY OF THE INVENTION

Therefore, it is the object of the present invention to provide an improved thermoforming machine, which assures a more suitable coupling of the lower and the upper plate for pulling them together.

This object is accomplished according to the invention through a thermoforming machine with the features of patent claim 1.

The basic idea of the present invention is that a thermoforming machine comprises a frame, a first plate and a second plate for receiving form sections, wherein at least one of the plates is adjustable relative to the frame, drive means for adjusting the plates relative to each other, and a pulling mechanism for pulling the second plate in the direction of the first plate, wherein the pulling mechanism comprises at least one pulling device, mounted to one of the plates, the pulling device including a pulling rod, which can be clamped by friction locked coupling through an associated clamping device, mounted at the other one of the plates, when adjusting the first and second plates relative to each other.

Thus the present invention has the advantage over the above-described approach, that a damage of the pulling mechanism or the connecting elements for coupling the two plates does not occur when the predetermined maximum value for the respective pulling force acting upon the respective plate is exceeded, since, due to the friction locked clamping connection according to the invention, the two elements clamped together in a friction-locked (non-positive) manner, perform motions relative to each other, which means that a slippage of the pulling rod, e.g. the piston rod, through an associated clamping device is assured, when exceeding a predetermined maximum value for the pulling force acting upon the respective plate, without the respective elements of the pulling mechanism being destroyed or damaged.

The dependant claims include advantageous embodiments and improvements of the thermoforming machine provided in patent claim 1.

According to a preferred embodiment, the thermoforming machine has an upper plate, which is continuously adjustable vertical to the frame, through a drive motor and associated spindles, in particular, ball screw spindles. In an analogous manner, the thermoforming machine additionally comprises a lower plate disposed below the upper plate, which is preferably also vertically adjustable vertical to the frame through an additional drive motor with associated spindles, in particular, ball screw spindles. Thus the lower and the upper plate can be adjusted in their elevation accordingly, depending on the respectively used form sections, and can be brought into a suitable elevation relative to each other.

Additionally, the upper plate and/or the lower plate are preferably also adjustable in a horizontal manner relative to the frame through associated adjustment elements, so that the respectively used form sections of the upper and lower plates can be adjusted relative to each other.

According to an additional preferred embodiment, several, preferably four, piston devices, formed as hydraulic cylinders, are mounted to the upper plate in a solid manner, and respective associated clamping devices, this means preferably four clamping devices, are mounted to the lower plate respectively formed as clamping cylinders. The piston devices or the respective piston rods are aligned with the respectively associated clamping devices, so that during an adjustment of the upper and the lower plate towards each other, the piston rod of a piston device of the upper plate moves into an associated clamping device of the lower plate, so that it can be clamped in a friction locked manner with such clamping force, so that when a predetermined pulling force is exceeded, the piston rod can slide out of the associated clamping cylinders. Thereby, neither the piston rod, nor the clamping devices are damaged, when a maximum pulling force is exceeded.

According to a further preferred embodiment, after providing the friction locked connections between the piston rods of the hydraulic pistons of the upper plate and the associated clamping devices of the lower plate through operating the hydraulic cylinders, the lower plate is pulled in the direction of the upper plate with a predetermined pulling force, and a deformation of the provided material through the form sections coupled with the plates is assured.

In an advantageous manner, the clamping devices are provided as hydraulic or pneumatic clamping cylinders respectively, which have a respective clamping bushing with an outer cone, and a clamping sleeve with an inner cone, wherein the clamping bushing is axially fixated in a housing of the clamping device, and radially movable, and the clamping sleeve is axially guided in the housing and slideable, for clamping a piston rod, which is received in the clamping device, in axial direction along the clamping axis through pneumatic or hydraulic force loading. Thereby, a friction locked coupling between the piston rod and the associated clamping device, or the upper plate, and the lower plate is assured in a simple and cost effective manner, wherein a relative dislocation of the coupled components is possible, and thus damages can be avoided, when a maximum pulling force is exceeded.

Furthermore, the thermoforming machine preferably has an upper heating device, which is provided below the upper plate, and a lower heating device, which is provided above the lower plate, wherein at least one of the heating devices is adjustable vertical to the frame through an associated adjustment device, and comprises several independent heating sections, preferably two heating sections disposed next to each other.

The invention is subsequently described in more detail based on exemplary embodiments, and with reference to the attached figures of the drawings.

DETAILED DESCRIPTION OF THE INVENTION

Figure 1:
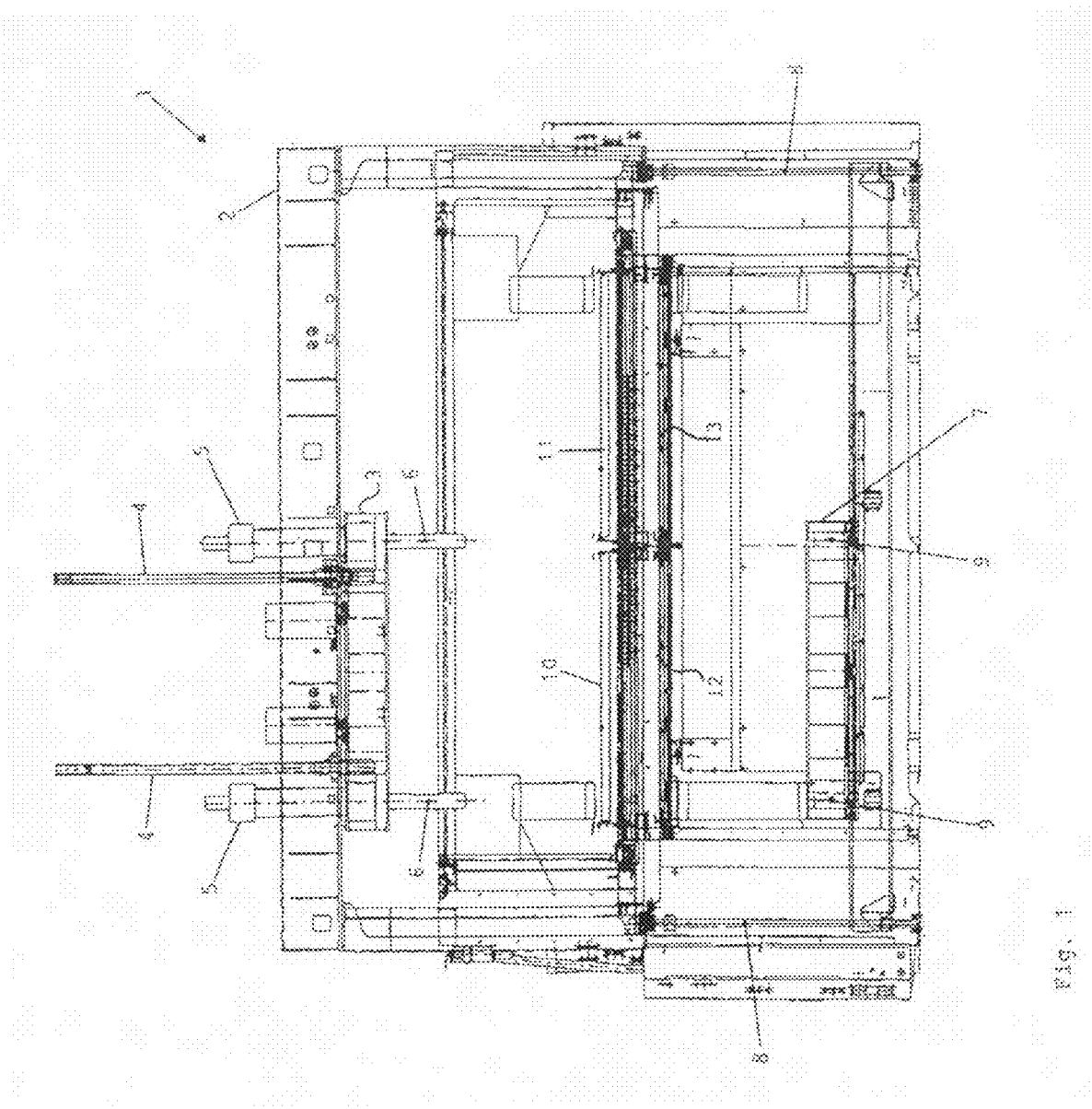
FIG. 1 is a schematic front view of a thermoforming machine, according to a preferred embodiment of the present invention.

In the figures, identical reference numerals designate identical or functionally equivalent components, unless otherwise noted.

As shown in FIG. 1, a thermoforming machine 1 according to the present embodiment comprises a frame 2 for carrying the various components of the thermoforming machine 1. Preferably the thermoforming machine 1 comprises an upper plate 3, to which predetermined form sections for forming the material to be thermoformed are mounted. The upper plate 3 is adjustable in elevation through an associated drive motor and associated ball screw spindles 4, preferably vertical to the frame 2. Furthermore, when required, the upper plate 3 can be additionally supported horizontally and adjustable relative to the frame 2 through suitable drives and adjustment elements.

For example, four ball screw spindles 4 are provided, which are disposed in a rectangular pattern relative to the upper plate 3, allowing a smooth elevation adjustment of the upper plate 3.

As furthermore shown in FIG. 1, the thermoforming machine 1 additionally preferably comprises several hydraulic cylinders 5, which are fastened to the upper plate 3. In the hydraulic cylinders 4, e.g. predetermined and well known distance measuring devices can be integrated for detecting the adjustment distance. The respective piston rods 6 of the hydraulic cylinders 5 protrude downward, below the upper plate 3, in an extended state of the thermoforming machine 1, which is illustrated in FIG. 1 in an exemplary manner.

Furthermore, the thermoforming machine 1 with reference to FIG. 1 comprises a lower plate 7, to which predetermined form sections are mounted, analogous to the upper plate 3, which correspond to the form sections of the upper plate 3 for forming the material to be thermoformed. The lower plate 7 is preferably also vertically adjustable relative to the frame 2, according to the present embodiment via an associated drive and associated ball screw spindles 8, so that the upper plate 3 and the lower plate 7 are adjustable relative to each other, and towards each other, depending on the respective form sections that are used, or depending on the formed piece to be manufactured.

At the lower plate 7, preferably several clamping cylinders 9 are fastened, so that an opposing clamping cylinder 9 is associated in a suitable manner to each piston rod 6 or to each hydraulic cylinder 5 of the upper plate. Thus during an adjustment of the upper plate 3 and the lower plate 7 towards each other through the above-described drives and adjustment elements, each piston rod 6 of a hydraulic cylinder 5 can be inserted accordingly into an associated clamping cylinder 9, and connected to it through friction locking, wherein such coupling will be described subsequently with reference to FIG. 2 in more detail.

Similar to the upper plate 3, the lower plate 7 can also preferably be moved through associated drives and adjustment elements, relative to the frame 2 in a horizontal manner, in order to perform a desired thermoforming process in connection with the accordingly aligned upper plate 3. It is also conceivable that only one of the plates 3, 7 is supported horizontally adjustable.

According to the present embodiment, the thermoforming machine 1 has a heating mechanism, which has, e.g., two upper heating devices 10, 11, which are also vertically adjustable, relative to the frame 2, through suitable drives and adjustment elements, according to the thermoforming process to be performed respectively. Below the upper heater devices 10, 11, preferably two lower heater devices 12, 13 are provided, which are also vertically adjustable through suitable drives and adjustment elements relative to the frame 2. The upper heating devices 10, 11, and the lower heating devices 12, 13 are provided for heating the material to be thermoformed before the thermoforming process.

Figure 2:
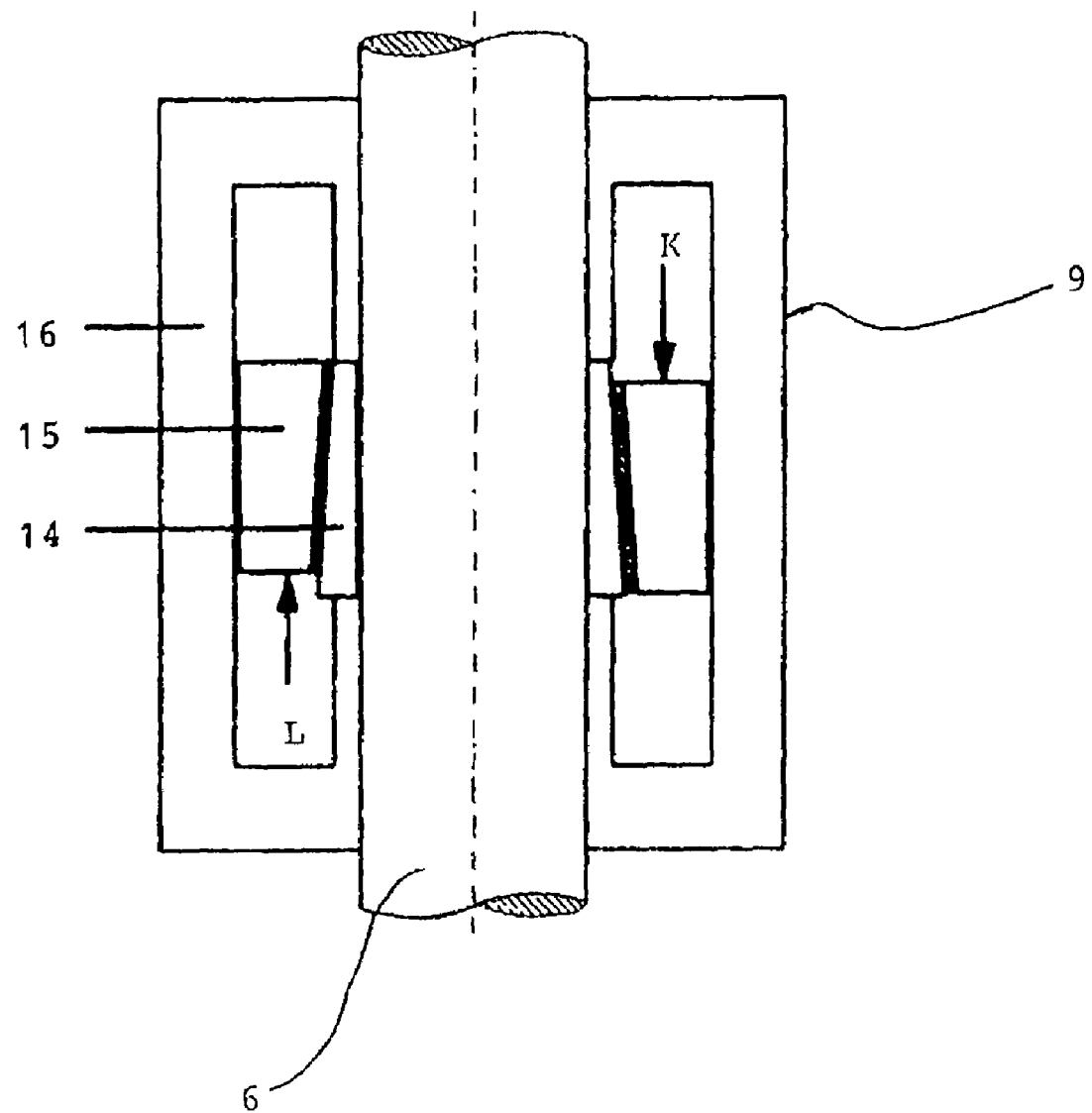
FIG. 2 is a schematic illustration of a clamping device, according to a preferred embodiment of the present invention in a clamped or a disengaged state.

Subsequently a thermoforming process through the exemplary thermoforming machine 1 of the present embodiment is described in more detail with reference to the FIGS. 1 and 2. The state of the thermoforming machine 1 illustrated in FIG. 1 shows the state of the machine before the thermoforming process. Before the beginning of the thermoforming process, the upper plate 3 and the lower plate 7 are moved towards each other through the drives and adjustment elements described above, for example, the upper plate 3 is moved downwards in the direction of the lower plate 7, and/or the lower plate 7 is moved upwards in the direction of the upper plate 3. Due to this relative motion of the upper plate 3 and the lower plate 7, the piston rods 6 of the hydraulic cylinders 5 of the upper plate 3 are inserted into the respective associated clamping cylinders 9 of the lower plate 7, accordingly disposed below the hydraulic cylinders 5, as illustrated in FIG. 2 in a schematic partial view. The left half of FIG. 2 thus illustrates the clamping cylinder 9 in a disengaged state L, and the right half of FIG. 2 shows the clamping cylinder in a clamped state K.

Each clamping cylinder 9 can continuously clamp an associated piston rod 6 without changing its position, and, furthermore, each clamping cylinder 9 can bear axial forces in both directions. The clamping cylinders 9 are activated or deactivated through force loading, in particular through hydraulic force loading. It will be appreciated by a person skilled in the art, that a pneumatic force loading is also possible.

The clamping cylinders 9 preferably comprise a respective clamping bushing 14 with an outer cone and a clamping sleeve 15 with an inner cone, as illustrated in FIG. 2. The clamping bushing 14 is preferably guided in a housing 16 of the clamping cylinder 9, and is compressed in axial direction for clamping the associated piston rod 6 via the clamping bushing 14. The required clamping force is accomplished, e.g., through the said hydraulic pressure loading.

In FIG. 2, the reference symbol K designates a clamping force for clamping the clamping sleeve 15 via the clamping bushing 14 for clamping the inserted piston rod 6. Similarly, the reference symbol L in FIG. 2 designates a force for disengaging the clamping, so that the inserted piston rod 6 can slide in the clamping cylinder 9 without friction.

Through such a coupling of the piston rods 6 with the respectively associated clamping cylinders 9, a friction locked connection between the piston rods 6 and the respectively associated clamping cylinders 9, or between the upper plate 3 and the lower plate 7 is assured.

For performing the thermoforming process, after performing the said friction locked connection, the hydraulic cylinders 5 of the upper plate 3 are driven, so that a pulling force of a predetermined size is imparted to the lower plate 7, comprising the clamping cylinders 9. Thus the lower plate 7 is pulled against the upper plate 3 for delivering the required forming force for thermoforming the heated material through the provided form sections of the upper plate 3 and the lower plate 7 with a predetermined pulling force. Due to the above described friction locked connection between the piston rods 6 and the associated clamping cylinders 9, a sliding motion of the inserted piston rods 6 relative to the associated clamping cylinders 9 advantageously occurs when a predetermined maximum value of the pulling force is exceeded. Through this sliding out of the piston rods 6 from the associated clamping cylinders 9, when a predetermined pulling force is exceeded, damages to the particular components are avoided, contrary to an, e.g., form-fit connection between the respective components.

After a successfully completed thermoforming process, the pulling force imparted upon the lower plate 7 is disengaged through the respective drives of the hydraulic cylinders 5, the upper plate 3 and the lower plate 7 are moved apart from each other through the respective drives and adjustment elements, and the thermoformed piece is removed.

Though the present invention was described in the above with reference to preferred embodiments, it is not limited to them, but can be modified in many ways.

For example, pneumatic cylinders can also be used instead of hydraulic cylinders, which assure the respective pulling forces. Also, the number and placement of the piston cylinders on the upper plate, as well as of the associated clamping cylinders on the lower plate, can be modified as appropriate, and shall be preferably selected such that a smooth relative motion of the upper and the lower plates is possible relative to each other.

Furthermore, also different clamping mechanisms, than the ones shown in FIG. 2 are conceivable for providing a friction locked coupling.

REFERENCE NUMERALS

1 Thermoforming machine
2 Frame
3 Upper plate
4 Ball screw spindle
5 Hydraulic cylinder
6 Piston rod
7 Lower plate
8 Ball screw spindle
9 Clamping cylinder
10 Upper heating device
11 Upper heating device
12 Lower heating device
13 Lower heating device
14 Clamping bushing
15 Clamping sleeve
16 Housing

What is claimed is:

1. A thermoforming machine comprising:
a frame;
a first plate and a second plate for receiving form sections, wherein at least one of the plates is adjustable relative to the frame;
drive means for adjusting the plates relative to each other; and
a pulling mechanism for pulling the second plate in the direction of the first plate, wherein the pulling mechanism includes at least one pulling device mounted to one of the plates, the pulling device including a pulling rod, which can be clamped by a friction locked coupling with an associated clamping device, mounted at the other one of the plates, when adjusting the first and second plates relative to each other.

2. A thermoforming machine according to claim 1, wherein the first plate is provided as an upper plate, which is vertically adjustable relative to the frame through first drive means.

3. A thermoforming machine according to claim 2, wherein the first drive means include a drive motor and several spindles, in particular ball screw spindles, for a smooth adjustment of the upper plate, vertical to the frame.

4. A thermoforming machine according to claim 1, wherein the second plate is provided as a lower plate disposed below the upper plate, which is vertically adjustable relative to the frame through second drive means.

5. A thermoforming machine according to claim 4, wherein the second drive means include a drive motor and a plurality of spindles, for a smooth adjustment of the lower plate, vertical to the frame.

6. A thermoforming machine according to claim 5, wherein the spindles are ball screw spindles.

7. A thermoforming machine according to claim 4, wherein the upper plate and/or the lower plate are adjustable in a horizontal manner relative to the frame through associated adjustment elements.

8. A thermoforming machine according to claim 4, wherein four hydraulic cylinders are disposed at the upper plate as pulling devices, and respective associated clamping devices formed as clamping cylinders are mounted at the lower plate.

9. A thermoforming machine according to claim 8, wherein each piston rod of a hydraulic cylinder of the upper plate is insertable into a respective associated clamping cylinder of the lower plate, when adjusting the plates towards each other, and can be clamped respectively in a friction locked manner with such a clamping force that the piston rods slide out of the associated clamping cylinders when a predetermined pulling force is exceeded.

10. A thermoforming machine according to claim 4, wherein when operating the pulling devices of the upper plate the lower plate, coupled via the clamping devices in a friction locked manner, can be pulled in the direction of the upper plate with a predetermined pulling force.

11. A thermoforming machine according to claim 1, wherein the clamping devices are hydraulic or pneumatic clamping cylinders, each having a respective clamping bushing with an outer cone, and a clamping sleeve with an inner cone, wherein the clamping bushing is axially fixated in a respective housing of the associated clamping device, and radially movable, and the clamping sleeve is axially guided in the housing, and slideable in axial direction through predetermined force loading for clamping an associated piston rod, received in the clamping device, through the associated clamping bushing.

12. A thermoforming machine according to claim 4, wherein the thermoforming machine includes at least one upper heating device, which is provided below the upper plate, and at least one lower heating device, which is provided above the lower plate, wherein at least one of the heating devices is vertically adjustable relative to the frame through an associated adjustment device, and has at least two independent heating sections, disposed next to each other.

* * * * *